United States Patent [19]

Sage

[11] Patent Number: 5,362,846

[45] Date of Patent: Nov. 8, 1994

[54] HIGH MELTING POINT CRYSTALLINE POLYAMIDES

[75] Inventor: Jean-Marc Sage, Serquigny, France

[73] Assignee: Elf Atochem S.A., Puteaux, France

[21] Appl. No.: 75,289

[22] Filed: Jun. 11, 1993

[30] Foreign Application Priority Data

Jun. 12, 1992 [FR] France .................. 92 07083

[51] Int. Cl.$^5$ .............................. C08C 69/26
[52] U.S. Cl. ........................ 528/344; 528/339; 528/347
[58] Field of Search ............... 528/344, 339, 347

[56] References Cited

U.S. PATENT DOCUMENTS 4,012,365 3/1977 Moriyama et al. ............... 528/208
4,246,395 1/1981 Mortimer ......................... 528/208

FOREIGN PATENT DOCUMENTS 0411791 2/1991 European Pat. Off. .
0463932 1/1992 European Pat. Off. .

OTHER PUBLICATIONS

Database Chemical Abstracts (Host Stn), vol. 102, No. 4, 1993, abrege No. 25902h, Columbus, Ohio, US; & JP-A-59 126 484 (Showa) 21-07-1984.

Primary Examiner—Nathan M. Nutter
Assistant Examiner—P. Hampton-Hightower
Attorney, Agent, or Firm—Burns, Doane, Swecker & Mathis

[57] ABSTRACT

Copolyamides having high crystallinity over the whole composition range, a melting enthalpy $\Delta H > 3.5$ cal/g and a melting point $T_M$ higher than 270° C. and articles manufactured therefrom are disclosed, said copolyamides comprising, by moles:

a) 1 to 99% of a unit A of formula $$-(NH-R-NHCO-AR_1-CO)-$$

in which R is a $-(CH_2)_n-$ carbon chain where n is coma) between 4 and 20, and $AR_1$ is the residue from the condensation of terephthalic acid and/or of the diester form thereof; and b) 99 to 1% of a unit B of formula $$-(NH-R-NHCO-AR_2-CO)-$$

in which R is the same carbon chain as in unit A and $AR_2$ is the residue from condensation of naphthalene-2,6-dicarboxylic acid and/or the diester form thereof.

14 Claims, 7 Drawing Sheets

HIGH MELTING POINT CRYSTALLINE POLYAMIDES

BACKGROUND OF THE INVENTION

The present invention relates to novel high melting point crystalline polyamides, and to compositions containing them, as well as to objects, for example molded or extruded objects, obtained from these polyamides; it also concerns the process for producing these polyamides.

Polyamides are currently employed in various types of industry. Such polyamides needs to possess various properties enabling them to be used under increasingly severe conditions. Thus, there is a demand for polyamides having excellent thermo-mechanical properties. Such polyamides must thus exhibit these properties at high temperatures, typically above or equal to 250° C., in other words their melting temperature $T_M$ must be higher than or equal to 250° C. Mechanical properties such as flexural modulus, hot deformation temperature (HDT), impact resistance, and, in particular, a high modulus of rigidity, among others, are the mechanical properties that the copolyamide should possess.

The mechanical properties of the polyamides are typically linked to their crystallinity, and this hence should be high. Moreover, these polyamides should also have a high glass transition temperature, conventionally above or equal to 120° C. Moreover, as the polyamides are made up by several monomers, it is desirable for the thermo-mechanical properties of the polyamides to remain high over the whole range of composition of the polyamide.

Those skilled in the art will hence look for copolyamides having:

a) a melting temperature $T_M$ higher than or equal to 250° C.;
b) high crystallinity;
c) good mechanical properties such as a high modulus of rigidity,
d) a glass transition temperature $T_g$ higher than or equal to 120° C.;
e) maintenance of these properties throughout the composition range.

It is known that copolyamides contain a significant amount of the 6,T unit (a unit derived from condensation of hexamethylene diamine and terephthalic acid) leading to copolyamides able to withstand more stringent thermomechanical conditions, meaning that their melting temperature is in the range of 240° to 360° C. Usually, for reasons particular to the process and taking account of the temperatures at which the products deteriorate, specialists in the field look for copolyamides that include an appreciable amount of 6,T, and have melting temperatures in the range between 290° and 320° C. Higher melting temperatures make both the synthesis and transformation of these copolyamides difficult, for the reasons discussed above.

For example, introducing the 6,I unit, even if it does allow 6,I/6,T copolyamides to be obtained having high melting temperatures, nevertheless introduces the disadvantage of highly disorganizing the crystalline structure of the copolyamide. Thus, for a 6,I/6,T copolyamide of molar composition 70/30, an amorphous copolyamide is obtained having no defined melting point. As the 6,T unit content is increased, crystalline copolyamides are obtained having a high melting point but, however, their crystallinity rapidly falls for 6,T unit contents less than 60% molar. Similarly, 6,I/6,T copolyamides experience a drop of melting point to 215° C., for a 70/30 molar makeup.

It is moreover seen that the glass transition temperature for these copolyamides depends on the melting temperature, thus in order to obtain a glass transition temperature of 140° C. it is necessary to aim for a copolyamide melting points higher than or equal to 345° C.

EP-0 299 689 discloses copolyamides containing the 6,T unit in which the 6,I unit is present in variable proportions as indicated in the table below:

| molar composition % | 6,T/6,I Tf | Tg | crystallinity (%) |
|---|---|---|---|
| 65/35 | 307 | 119 | 14 |
| 70/30 | 325 | 126 | 25 |
| 80/20 | 345 | 134 | 29 |

EP-0 299 444 discloses copolyamides in which an aliphatic lactam type unit has undergone copolycondensation with the 6,T unit. However, introducing these aliphatic units decreases the glass transition temperature. In practice, there is a limitation to glass transition temperatures lower than 130° C.; moreover, these aliphatic lactam groups lead to a loss of mechanical properties of the material: of HDT, of flexural modulus, etc. A 6,T/6,I/6,N26 terpolyamide of composition 58/32/10 is exemplified in U.S. Pat. No. 4,246,395. It is however compared to the 6,T/6,I/6,BOB copolyamide of the same composition and $T_g$ and $T_M$ values (135° C./285° C.-133° C./285° C. respectively). However, the 6,N26 unit is considered as a third monomer. Only 6,I/6,T copolyamides (of the copolyamide family including the 6,T unit) are known to have pronounced crystallinity throughout the composition range [see Isomorphous replacement in copolyamide systems: adipic and terephthalic acid, Yu et al., Journal of Polymer Science, Vol. XVII, p. 249-257 (1960)]. However, the latter have glass transition temperatures lower than 120° C.; moreover, the 6,6 unit (originating from condensation of hexamethylene diamine with adipic acid) is well known for its lack of thermal stability, which limits its use. Thus, one frequently finds associated with this 6,6 unit, as a third component, the abovesaid 6,I/6,T or lactam/6,T copolyamides.

This particular feature, attributed to isomorphism of the constituent units of 6,6/6,T copolyamide, is well known to workers in the field and there are many publications covering it; it is attributed to co-crystallinity between the 6,6 and 6,T units. It is also known that this same tendency is found in analogous copolyamides originating from another aliphatic diamine having a longer chain (for example 8,I/8,T) (see: The p-phenylene linkage in linear high polymers: some structure property relationships. Edgar et al., Journal of Polymer Science, Vol. VIII, No. 1, p. 1-22).

Japanese examined patent application (Kokoku) serial No. 5-18877 issued on Mar. 15, 1993 discloses a polyamide, useful as a hot-melt adhesive composition, consisting of aromatic dicarboxylic acid units and $C_{10}$ aliphatic alkylenediamine units, said copolymers being however amorphous, which is surprisingly not the case for the copolymers according to the invention.

A BRIEF DESCRIPTION OF THE DRAWINGS

None of the above references describes or suggests the copolyamides that are the subject of the present invention, which, surprisingly, possess the properties a) to e) mentioned above.

This is exemplified by FIGS. 1 to 6 which show the X-ray diffraction spectra of the copolyamides in examples 21, 22, 24, 26, 27 and 28 respectively. The x-axis is the interplanar distance expressed in Angstrom units; the y-axis is the strength of diffraction (the value is provided by the apparatus's intrinsic counter and depends on acquisition time).

SUMMARY OF THE INVENTION

The present invention hence provides polyamides having high crystallinity over the whole composition range and having a high melting point comprising, by moles,:

a) 1 to 99% of a unit A of formula in which:

R is a —$(CH_2)_n$— carbon chain where n is comprised between 4 and 20;

$AR_1$ is the residue from the condensation of terephthalic acid and/or of the diester form thereof; and b) 99 to 1% of a unit B of formula in which:

R is the same carbon chain as in unit A;

$AR_2$ is the residue from condensation of naphthalene-2,6-dicarboxylic acid and/or the diester form thereof.

The expression "diester" as used in this present specification means the diester obtained with a group derived from an alcohol. Any group is appropriate, such as aryl, for example phenyl, such as $C_1$ to $C_{20}$ alkyl. A preferred derivative group is a $C_1$ to $C_6$ alkyl group and preferably a $C_1$ to $C_4$ alkyl group. Advantageously, the diester is methyl diester.

The expression "crystalline" as used in the present specification means that melting enthalpy ΔH is higher than 3.5 cal/g and that the percentage of crystallinity shown by X-ray determination is higher than 10%.

The abbreviations employed in this specification are those currently employed by specialists in the field. Thus, the expressions "6,6"; "6,I"; "6,T"; "6,BOB"; "6,N26"; ... etc. of hexamethylenediamine with, respectively: isophthalic acid, terephthalic acid, 4,4'-dicarboxydiphenylenether, naphthalene-2,6-dicarboxylic acid or their diester forms. Similarly, the expression "8,I" and "8,T" stand for units originating from condensation of octamethylenediamine with isophthalic and terephthalic acid respectively. The expressions 6,T/6,BOB; 6,T/6; 6,T/12; 6,T/6,I; 6,T/6,N26 stand for copolyamides composed of 6,T units with, respectively, the 6,BOB unit; the unit originating from 6-amino-hexanoic acid or lactam 6; the unit originating from 12-aminododecanoic or the lactam 12; the 6,I and the 6,N26 unit.

In a preferred embodiment of the invention, unit A constitutes from 50 to 90 molar % and unit B constitutes 50 to 10 molar %. Advantageously, unit A constitutes from 60 to 80 molar % and unit B constitutes 40 to 20 molar %.

In one embodiment of the invention, R represents a —$(CH_2)_n$— carbon chain, n being comprised between 4 and 12, and preferably between 4 and 9. Advantageously, R represents a —$(CH_2)_n$— carbon chain, n being equal to 6; the diamine is then hexamethylene diamine, abbreviated to HMDA below.

In one embodiment, $AR_1$ is terephthalic acid and $AR_2$ is the methyl diester of naphthalene-2,6-dicarboxylic acid.

The present copolyamides can contain up to 15 molar % based on the copolyamides, of a third unit, originating either from partial substitution of one of the diacid components by another diacid, or through partial substitution of the diamine component by another diamine, or through addition of a lactam- or aminoacid-type polycondensatable compound. Addition of this third monomer is envisaged to the extent where addition thereof leaves the properties of the polyamide according to the invention substantially unchanged; thus specialists in the field will be able to evaluate the effect of adding third monomers. $C_6$, $C_{11}$ or $C_{12}$ lactams or aminoacids can be cited by way of example.

The copolyamides according to the invention can also include additives conventionally used with polyamides, such as: thermal and light stabilisers, coloring agents, optical brighteners, plasticizers, mold release agents, fire-proofing agents, etc. The polyamides according to the invention can also be mixed with other homo- or co-polyamides, added in a proportion of up to 100% based on the polyamide according to the present invention.

The polyamides according to the invention can also be mixed with other polymers, for example copolymers of ethylene, maleic anhydride, and methyl, ethyl or butyl acrylates for example, such polymers generally being used in a content of up to 40% for the purpose of improving its shock resistance properties.

A known nucleation agent such as talc can also be added, generally in amounts of 0.1 to 15% by weight. Reference can be made to U.S. Pat. No. 3,755,221 dated Aug. 28, 1973 to Hitch, for a description of nucleating agents for 6,6 polyamides.

The invention also relates to compositions containing the above polyamides in association with a filler present in an amount of up to 200%, preferably from 10 to 60% by weight based on the weight of polyamide. Fillers envisaged for use in the present invention include conventional mineral fillers such as those chosen from the group, without this being limiting, typically comprising: kaolin, magnesia, slag-like products and so on, or glass fibers. The filler most generally employed consists of glass fibers, their dimensions being advantageously comprised between 0.20 and 25 mm. Coupling agents for improving adhesion between the fibers and the polyamide can be added, such as silanes and titanares, known to specialists in the field. Organic fillers can also be employed, such as graphite or aramide (totally aromatic polyamide) fibers.

The present invention also provides polyamides further containing up to 200% by weight, and preferably up to 100% by weight, based on the total resulting composition, of one or several of the conventional additives or fillers mentioned above.

The invention also relates to articles obtained from the above polyamides or compositions, referred to generically as "copolyamides".

In one feature of the invention, the preferred article is one obtained by molding, advantageously injection molding.

The polyamides of this invention can be obtained by the use of any appropriate process for producing polyamides. One can, notably for processes in which they are synthesized in the solid or liquid state, employ the acid or diester forms of terephthalic acid and/or napthtalene-2,6 dicarboxylic acid, for example methyl diesters thereof.

Non-limiting examples of processes for their preparation are given below, these involving the use of HMDA as the diamine for the sake of simplicity.

In a first process according to the present invention, said process comprises the single step of reacting terephthalic acid and naphthalene-2,6-dicarboxylic acid or the diester thereof, and the HMDA. The operating conditions are a temperature comprised between 280° and 350° C., preferably 290° to 330° C., an inert atmosphere, a pressure of 0.01 to 50 bar, preferably 200 mba to 30 bar, and a reaction time of from 20 minutes to 10 hours, preferably 1 to 6 hours.

In a second process for preparation, in accordance with the present invention, said process comprises the steps of:

a) reacting terephthalic acid with naphthalene-2,6-dicarboxylic acid or their diester with 10 to 99%, and preferably 35 to 75% by weight, of the HMDA diamine; and b) reacting the thus formed product with the remainder of the HMDA, In both steps, the reaction temperature is comprised between 240° and 350° C., and preferably between 280° and 330°. The process is carried in an inert atmosphere, at a pressure up to 50 bar, or at atmospheric pressure, or under vacuum. The reaction time is generally comprised between 1 and 10 hours.

In the process of the present invention, it is possible to employ, preferably during the second step as regards the latter process, known polyamidification catalysts, such as phosphoric and hypophosphorous acid, present in proportions up to 1% by weight.

It is possible to add the conventional fillers or additives mentioned above to the reaction medium at various stages in the process in line with the criteria known to those working in the field.

A third preparation process according to the invention comprises a first polymerisation step, up to a degree of advancement comprised between 40 and 99%, followed by a second step consisting in bringing about an increase in viscosity. The first step can be implemented using a conventional procedure, for example one of the two processes discussed above. At the end of this step, the pre-polymer can be directly transferred into the apparatus which may be an extruder or equally well a horizontal reactor where it may remain for periods varying from 5 minutes to 1 hour, preferably 15 to 45 minutes, in order to undergo increase of viscosity. Transfer can also be carried out through recovery of the solid pre-polymer in granular or powder form. Viscosity increase can also be achieved in the solid state by heating the prepolymer in powder or granular form at at a temperature comprised between its glass transition temperature $T_g$ and melting temperature $T_M$ (generally at a temperature of about $T_g+100°$ C.) under vacuum or in an inert gas flow.

The present invention is illustrated with the help of the following examples which, as the invention may be subject to variations readily accessible to those skilled in the art, should not be considered as limiting the scope thereof.

In the following examples melting point determination is supplied by DSC (differential scanning calorimeter) analysis using a Perkin Elmer DSCA analyser. The sample underwent a first thermal cycle from ambient temperature to 350° C. at 20° C./min, followed by cooling at 40° C./min down to ambient temperature. A second rising temperature thermal cycle was then performed (20° C./min). The melting temperatures $T_M$ and glass transition temperature $T_g$ were determined from this second cycle. The glass transition temperature was determined at the point of inflection, and the melting temperature was given by the minimum of the observed melting endothermic peak. Fusion enthalpy $\Delta H$ is given in cal/10 g.

Inherent viscosities were determined at a 0.5% concentration in metacresol at 25° C.

Determination of the degree of crystallinity was carried out by X-ray diffraction measurement on the polymer reduced to the powder state. The molten polymer was allowed to cool in the reactor after synthesis, by withdrawing the heating bath. It was then reduced to powder form and introduced into a quartz capillary tube and transmission therethrough was observed. Intensity of diffraction was picked up on a counter curved over an angular range of $2\theta$ [3,120°]. A Rigaku rotating anode generator was employed. The degree of crystallinity, after correcting the contribution made by the capillary tube, was calculated using N. S. Murphy's method (Polymer 1990, 31(6), p. 996–1002) enabling the crystallinities of semi-crystalline polymers to be compared.

Thermomechanical DMA analysis was carried out using a RSA2 (Rheometric Solid Analyser) instrument pulsed at 10 radians per second on a sample obtained by injection (dimensions 63.5/12/4 mm). The modulus was obtained in so-called "three point bending" mode.

EXAMPLES 1 TO 7

Comparative Examples

6,T/6BOB copolyamides were prepared in the following manner:

EXAMPLE 1

A glass reactor (height 200 mm, diameter 40 mm) provided with a glass anchor stirrer was employed. The reactor was fitted with a Vigreux column followed by a straight refrigerant enabling condensed water to be collected in a graduated test tube. The reagents were introduced into the reactor in powder form; generally speaking, the charged reactor was then left under slight nitrogen sweeping for 30 to 60 min in order to eliminate traces of oxygen. Following this, the nitrogen throughput was reduced in order to simply maintain the reactor under nitrogen (in bubblewise fashion).

Following this, 9.9 g of BOB acid, 14.85 g terephthalic acid and 15.25 g of HMDA were introduced.

The reactor was plunged into a heating bath kept at 250° C; after 5 min, the temperature was steadily brought up to 360° C. at a rate of about 1.5° C./min.

During this temperature increase, distillation of the polycondensation effluents was observed, the medium becoming progressively more fluid and its viscosity increasing. Towards 350° C., the medium had the consistency of a very thick paste, stirring was set to 20 rpm, and then maintained for a further 20 min at the end of which no further evolution of the medium was observed visually. The reaction was then stopped, the total volume of effluents was 4.3 ml (4.6 ml of water in theory).

The polymer obtained had a glass transition temperature of 135° C. and a melting temperature of 311° C., which are given in table 1 below.

EXAMPLE 2

12.8 g of BOB acid, 12.4 g terephthalic acid and 14.8 g of HMDA were introduced into the reactor of example 1.

The reactor was plunged into a heating bath kept at 240° C., and, after 10 min, the stirring was set to 25 rpm, the reaction medium then being of a pasty consistency. Following this, the temperature was increased to 330° C. over a 60 min period. During this temperature increase, distillation of the polycondensation effluents was observed, the medium becoming progressively more transparent, and its viscosity increasing. Towards 330° C., the medium had the consistency of an extremely thick paste. Stirring rate was lowered (10 rpm). The bath temperature was increased yet again up to 340° C. over 15 min, at the end of which the reaction was stopped. The total volume of the effluents was 4.5 ml (4.6 ml of water in theory).

The polymer obtained had a glass transition temperature of 141° C. and a melting temperature of 294° C., which are listed in table 1 below.

EXAMPLES 3 TO 7

The same operating procedure was used as in example 2 for examples 3 to 7. The temperatures $T_g$ and $T_M$, together with the melting enthalpy are listed in table 1 below:

TABLE 1

| Ex. no. | % mol. 6,T | Tg (°C.) | Tf (°C.) | ΔH (cal/10 g) |
|---|---|---|---|---|
| 1 | 70 | 135 | 311 | 57 |
| 2 | 60 | 141 | 294 | 60 |
| 3 | 50 | 140 | 273 | 8 |
| 4 | 43.7 | 145 | 262 | 1 |
| 5 | 34.1 | 130 | amorphous | 0 |
| 6 | 25 | 128 | amorphous | 0 |
| 7 | 20 | 146 | amorphous | 0 |

The 6,T/6,BOB copolyamides had appropriate Tg and Tf values, but for molar percentages of 6,T less than about 40%, an amorphous zone existed with a loss of crystallinity.

EXAMPLES 8 TO 11

Comparative Examples

6,T/6 copolyamides were prepared in a similar way to example 2 starting from terephthalic acid, amino-6-hexanoic acid and HMDA monomers.

The Tg and Tf temperatures are given in table 2 below.

TABLE 2

| Ex. no. | % mol 6,T | Tg (°C.) | Tf (°C.) |
|---|---|---|---|
| 8 | 31 | 85 | 215 |

TABLE 2-continued

| Ex. no. | % mol 6,T | Tg (°C.) | Tf (°C.) |
|---|---|---|---|
| 9 | 41 | 94 | 264 |
| 10 | 52 | 100 | 300 |
| 11 | 59 | — | 320 |

These copolyamides did not exhibit the appropriate Tg and Tf temperatures for molar percentages of 6,T less than 50%. For molar percentages of 6,T higher than 50%, Tg remained at an inappropriate level and the melting temperature was raised to values that made the feasibility of synthesis using molten medium processes difficult.

EXAMPLES 12 TO 15

Comparative Examples

6,T/12 copolyamides were prepared in a similar way to example 2 starting from terephthalic acid, amino-12-dodecanoic acid and HMDA monomers.

The Tg and Tf temperatures and the melting enthalpy are given in table 3 below.

TABLE 3

| Ex. no. | % mol. 6,T | Tg (°C.) | Tf (°C.) | ΔH (cal/10 g) |
|---|---|---|---|---|
| 12 | 26 | 58 | amorphous | 0 |
| 13 | 35 | 58 | 230 | 10 |
| 14 | 44 | 71 | 275 | 30 |
| 15 | 56 | 81 | 290 | 80 |

These copolyamides are amorphous for 6,T contents below 30% expressed as molar percent. Moreover, they do not have an appropriate Tg, the latter staying below 100° C.

EXAMPLES 16 TO 18

Comparative Examples

6,T/6I copolyamides were prepared in a similar way to example 2 starting from terephthalic acid, isophthalic acid and HMDA monomers.

The Tg and Tf temperatures and the melting enthalpy ΔH are given in table 4 below.

TABLE 4

| Ex. no. | % mol. 6,T | Tg (°C.) | Tf (°C.) | ΔH (cal/10 g) |
|---|---|---|---|---|
| 16 | 30 | 127 | amorphous | 0 |
| 17 | 50 | 126 | 270 | 60 |
| 18 | 60 | 123 | 286 | 110 |

These copolyamides are amorphous for 6,T contents below 35% expressed in molar percent.

EXAMPLES 19 TO 29

According to the Invention

6,T/6,N26 copolyamides were prepared in the following manner:

EXAMPLE 19

12.23 g of 2,6-naphthalene-dicarboxylic diacid methyl diester, 0.92 g of terephthalic acid and 7,11 g of HMDA were introduced into a glass reactor of dimensions 160/32 mm, fitted out in a manner similar to example 1.

The reactor was plunged into the heating bath kept at 220° C., and after 10 min, stirring was set to 25 rpm, reaction medium then being of pasty consistency. The bath temperature was then steadily increased up to 320° C. over a period of 60 min. During this increase in temperature, polycondensation effluent distillation was observed, and the reaction medium became progressively more transparent, and its viscosity increased. The reactor was kept at 320° C. for 40 to 60 min, after which the reaction was stopped.

EXAMPLES 20 TO 29

Operation was similar to that in example 19. Measurements of inherent viscosity for examples 25 and 27 yielded values of respectively 0.67 and 0.67. The Tg, Tf temperatures, and the melting enthalpy ΔH together with the crystallinity percentage determined by X-ray analysis are given in table 5 below.

TABLE 5

| Ex. no. | % mol. 6,T | Tg (°C.) | Tf (°C.) | ΔH (cal/10 g) | % crystallinity |
|---|---|---|---|---|---|
| 19 | 10 | 120 | 320 | 37 | — |
| 20 | 20 | 129 | 300 | 40 | — |
| 21 | 30 | 130 | 295 | 74 | 18 |
| 22 | 40 | 125 | 280 | 74 | 17.5 |
| 23 | 44 | 131 | 280 | 81 | — |
| 24 | 46 | 130 | 280 | 71 | 14 |
| 25 | 48 | 126 | 282 | 73 | — |
| 26 | 50 | 134 | 284 | 96 | 13 |
| 27 | 60 | 136 | 285 | 63 | 16 |
| 28 | 70 | 138 | 299 | 77 | 15 |
| 29 | 80 | 141 | 330 | 90 | — |

Figure 1:
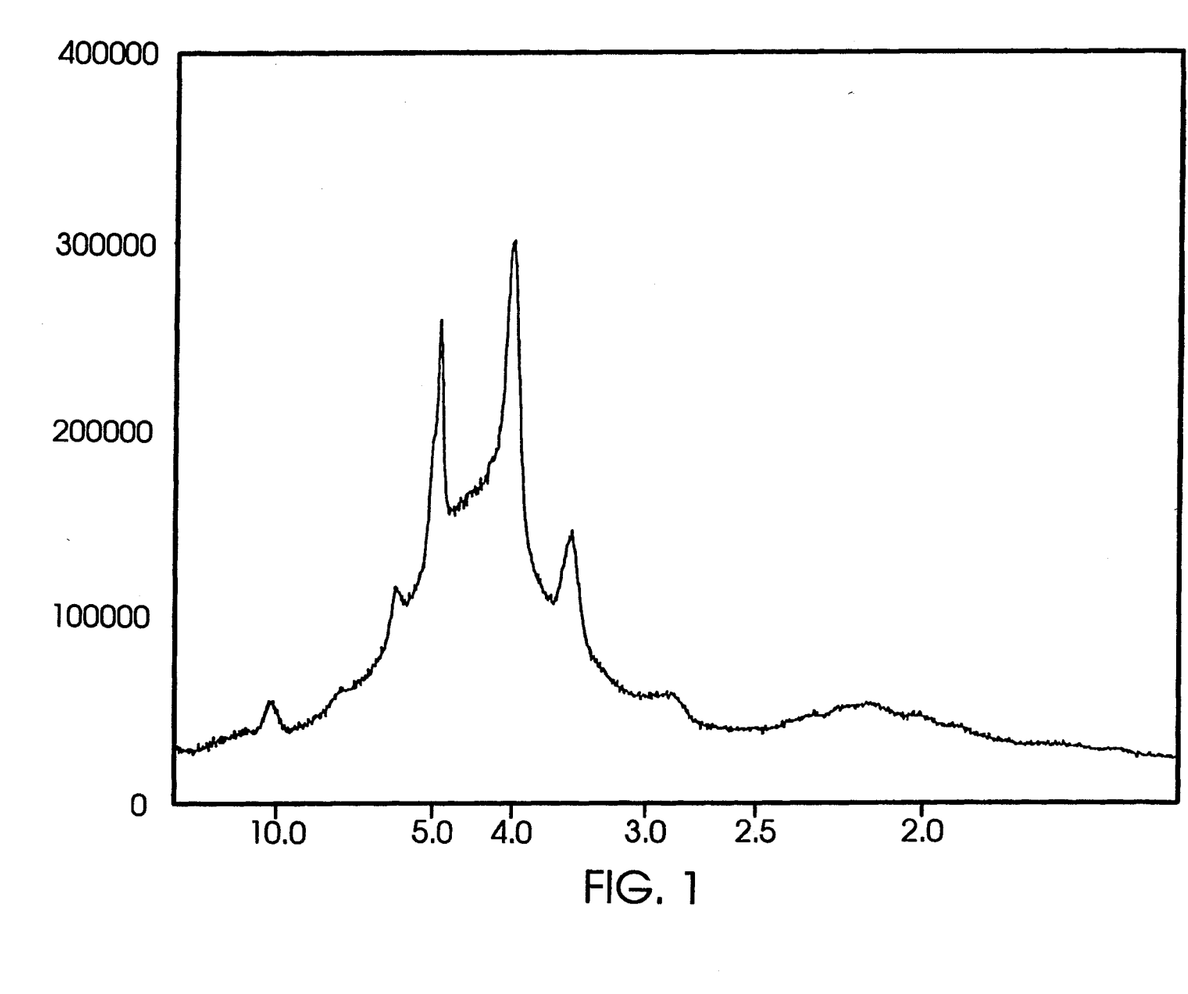
Figure 2:
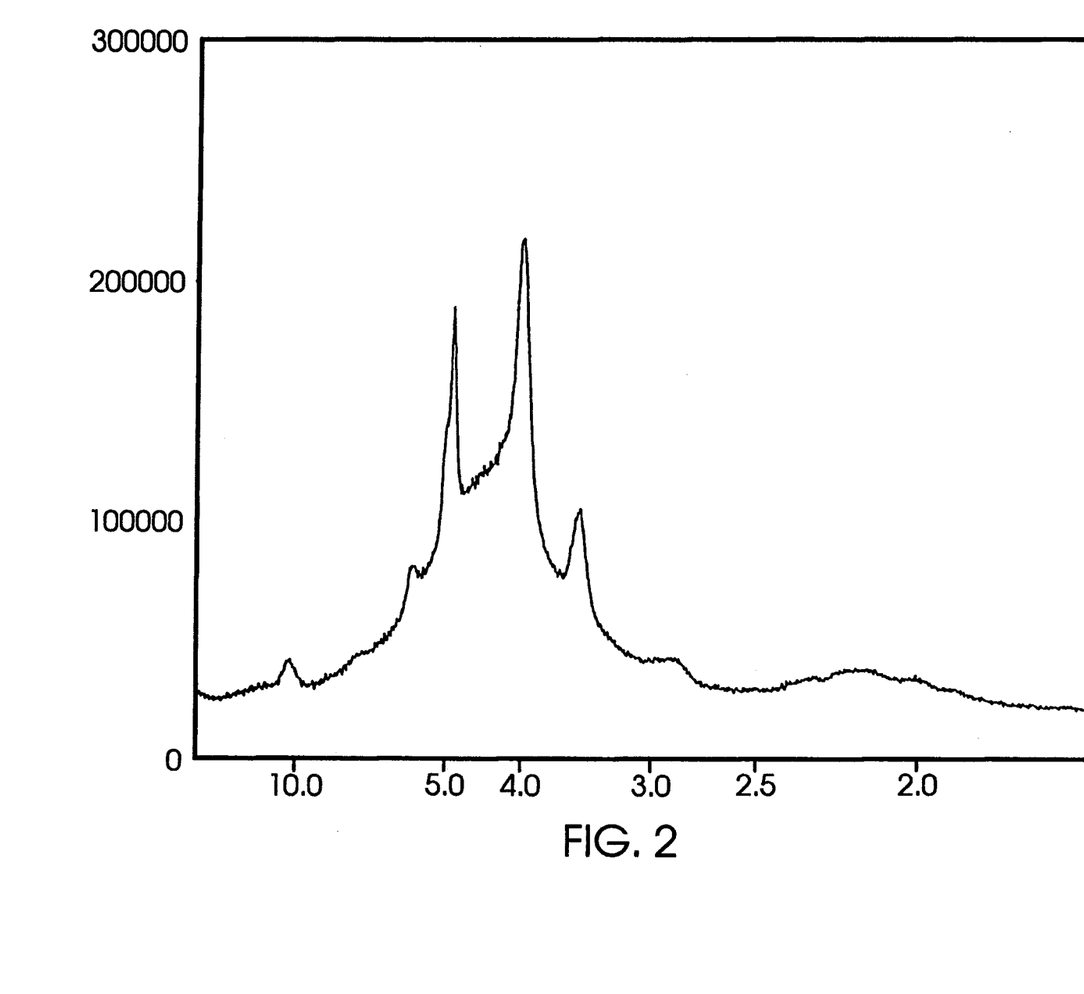
Figure 3:
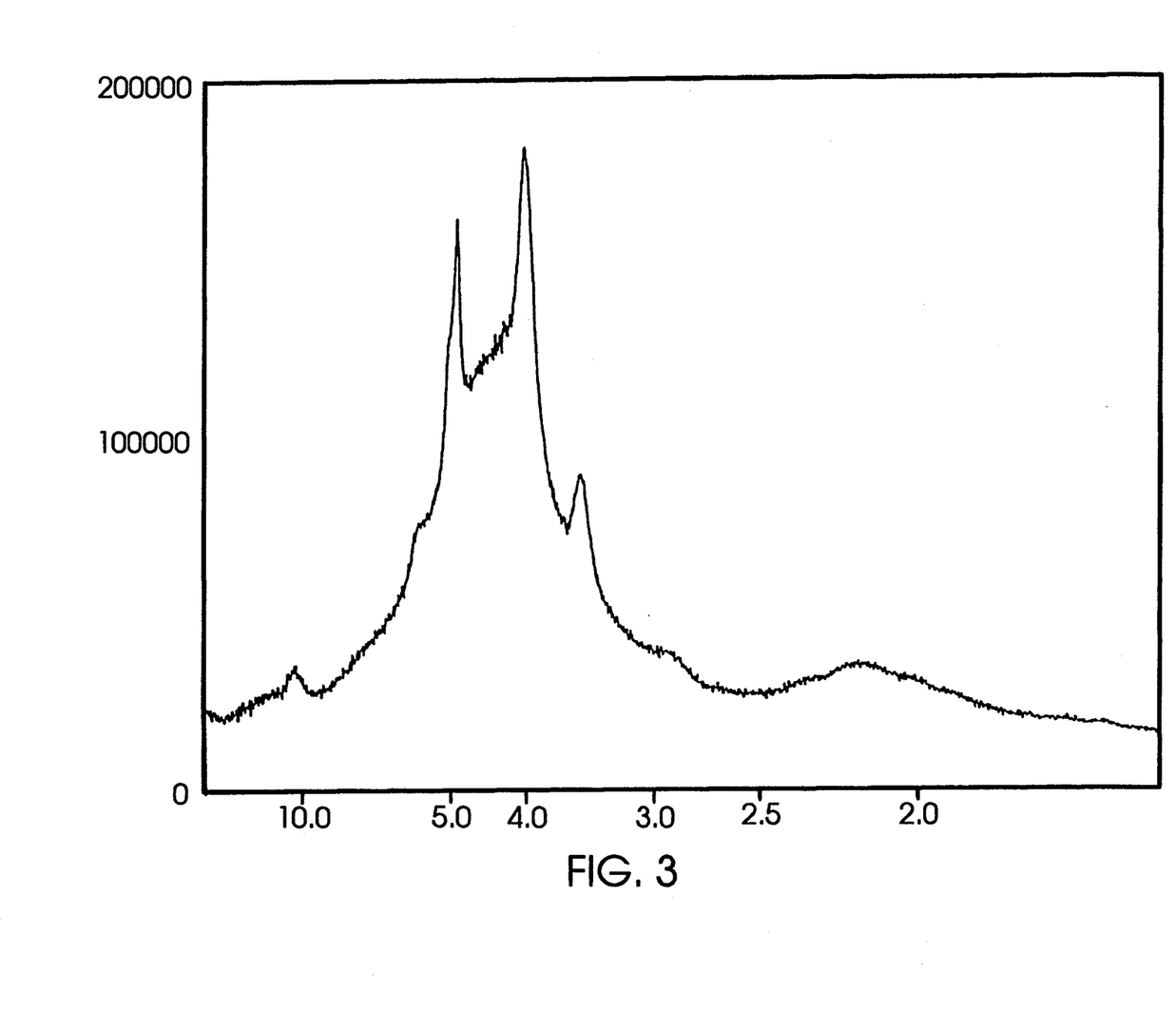
Figure 4:
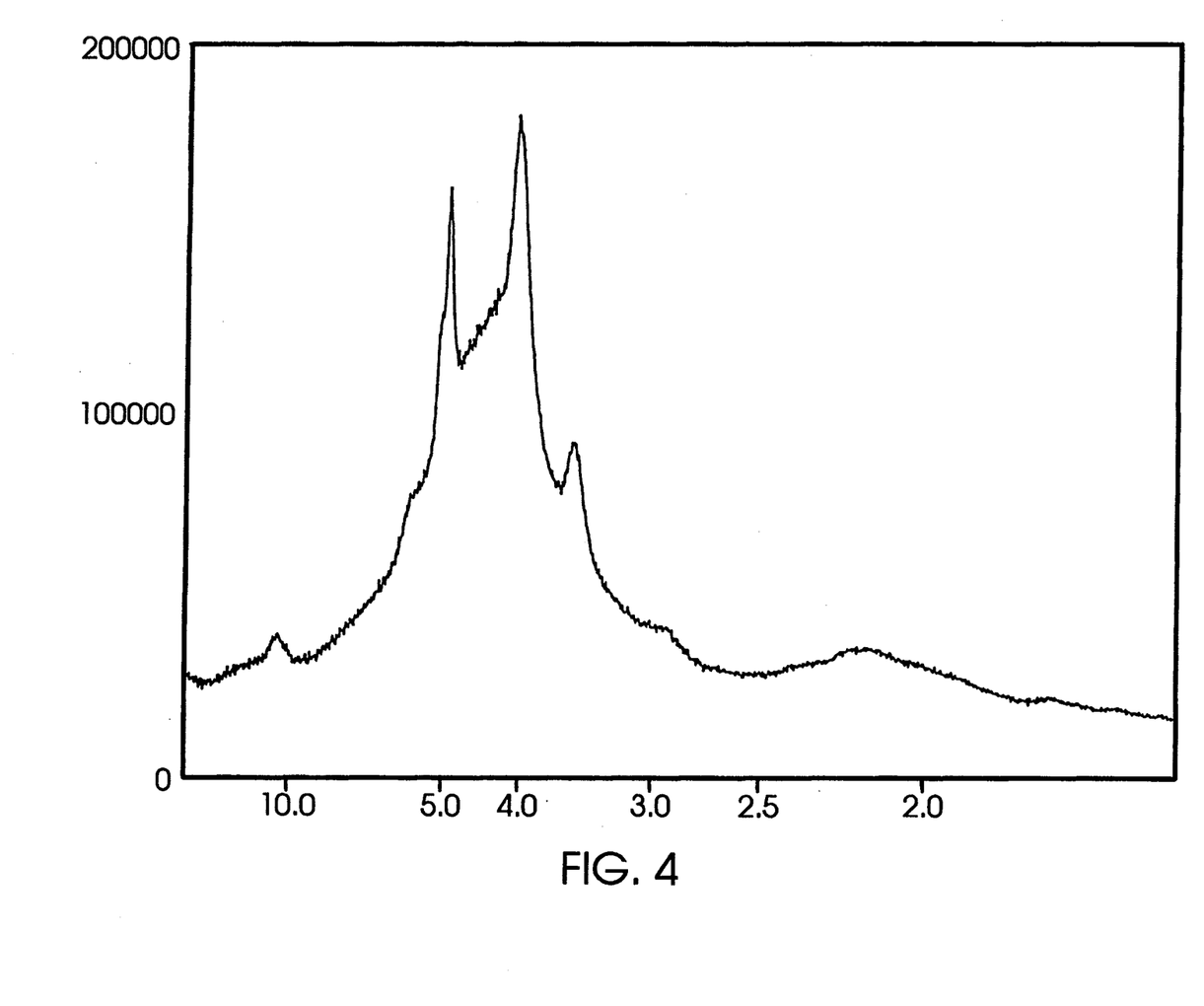
Figure 5:
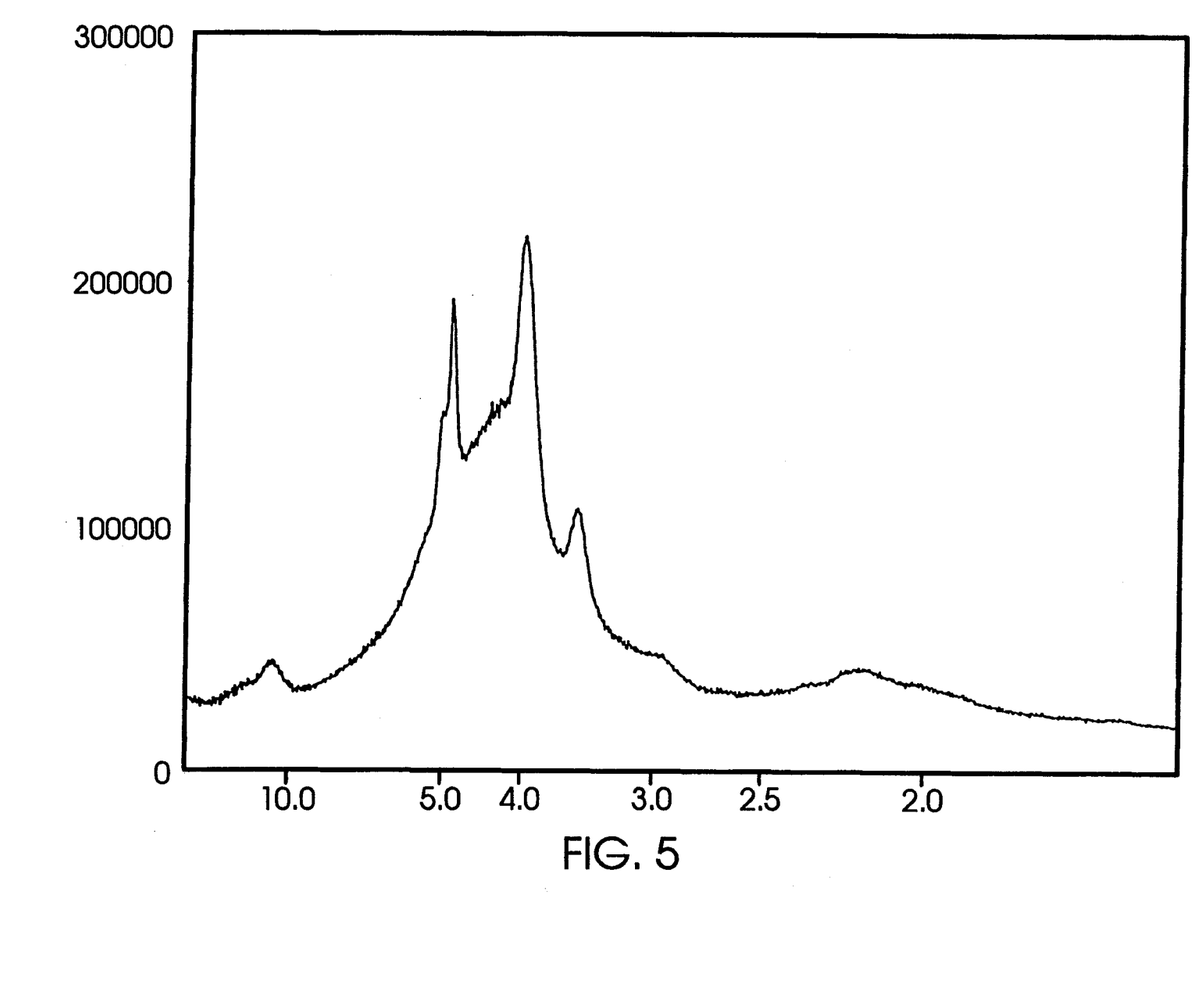
Figure 6:
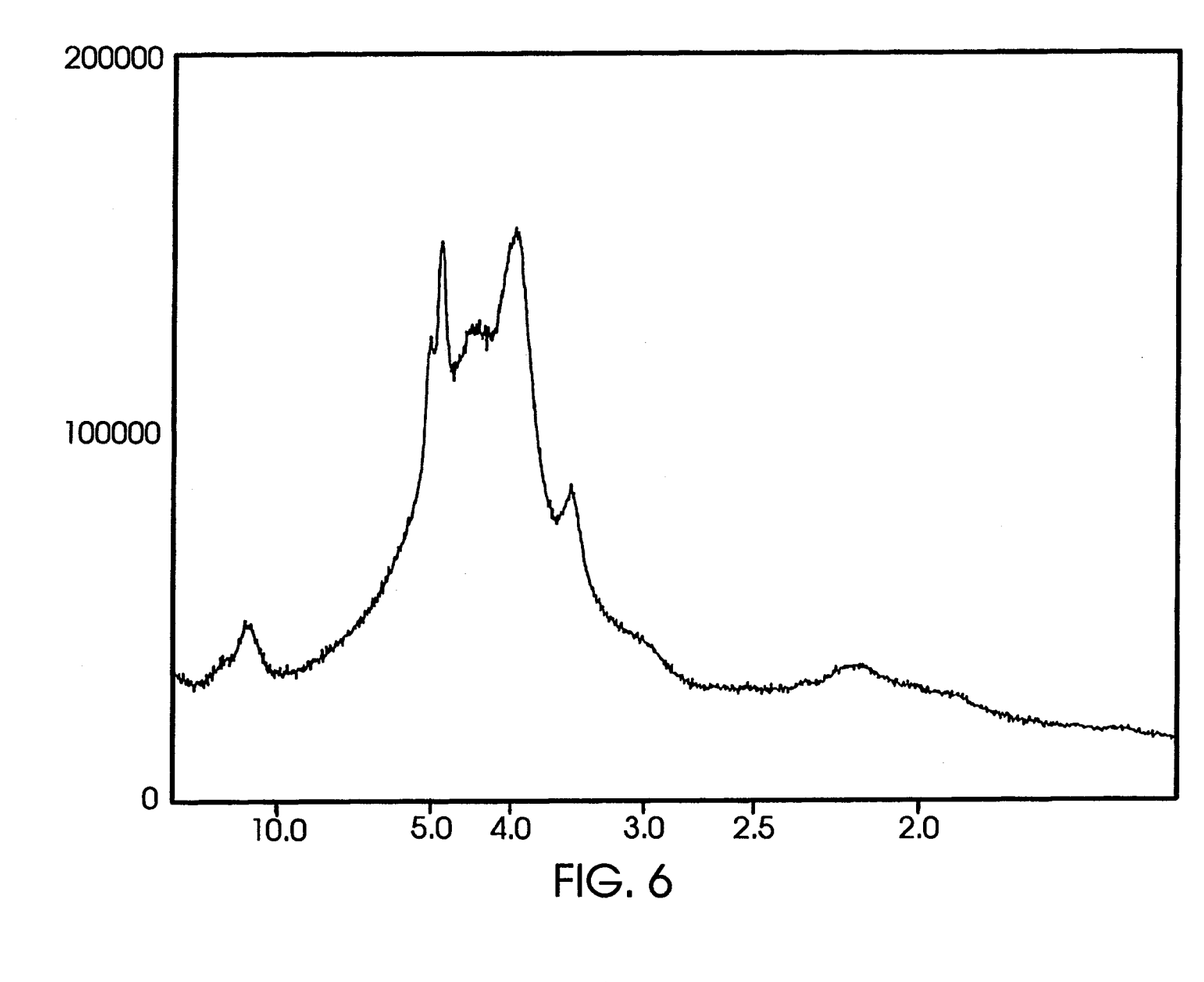

FIG. 1 shows their X-ray spectra.

EXAMPLE 30

Figure 7:
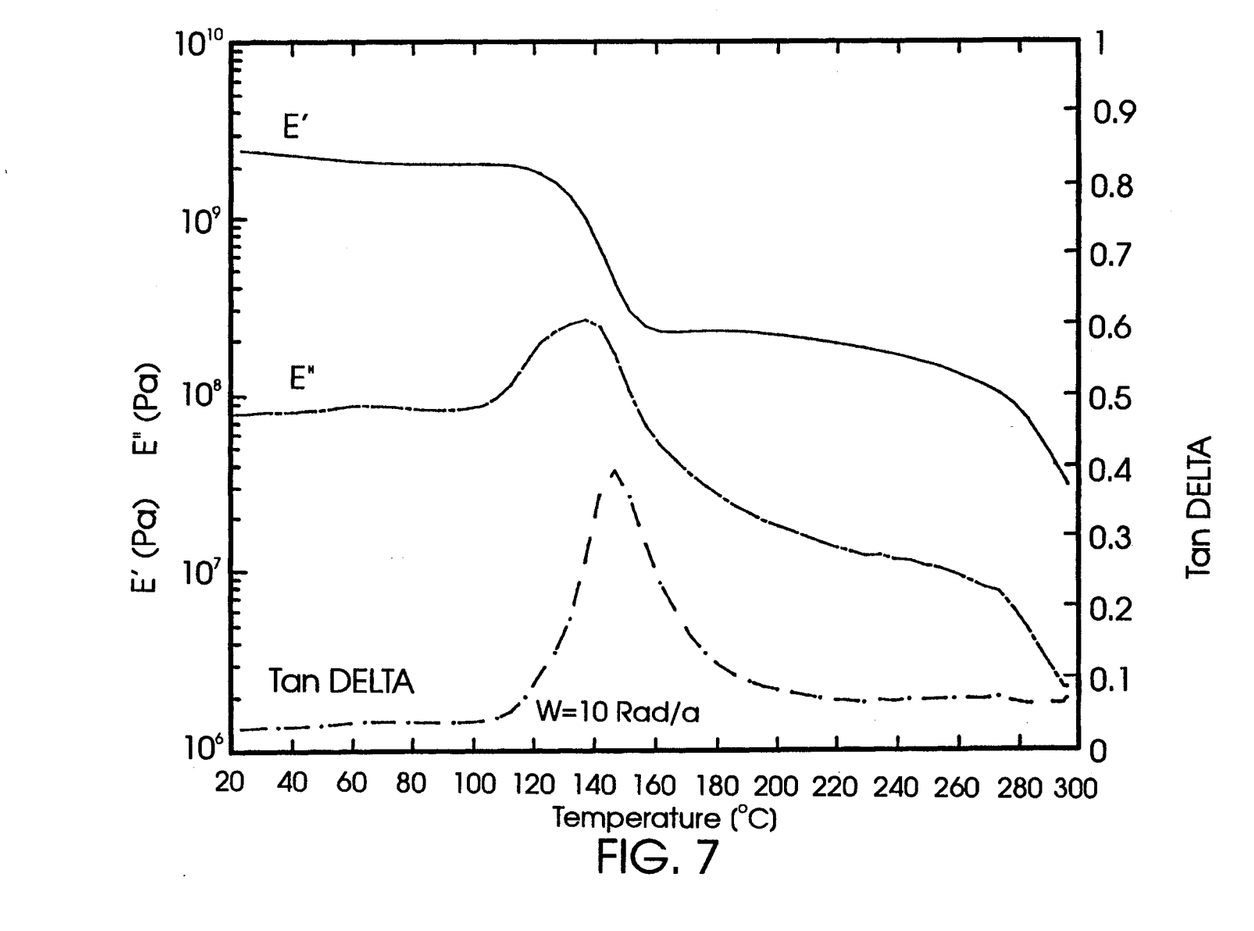
FIG. 7 shows, for a copolyamide according to the present invention, Young moduli E' and E", expressed in Pascals, as well as tan δ (ratio of E" to E') as a function of temperature with a pulsation W of 10 rad/sec. The measurements were done on a RSA2 apparatus.

A 6T,6N polymer of composition 70/30, similar to that of example 28, was injection moulded. FIG. 7 shows its Young modulus as a function of temperature, and the relation between them.

The copolyamides according to the invention had, throughout the whole composition range, crystallinity properties, a Tg>120° C. and a Tf>270° C.

What is claimed is:

1. A copolyamide composition consisting essentially of
    (1) a copolyamide consisting essentially of
        (a) from 1 to 99 mole % repeating units of the formula —(NH—R—NHCO—$AR_1$—CO)—; and
        (b) from 99 to 1 mole % repeating units of the formula —(NH—R—NHCO—$AR_2$—CO)—; wherein R is alkylene having from 4 to 20 carbon atoms, $AR_1$ is a residue from the condensation of a compound selected from the group consisting of terephthalic acid, a terephthalic acid diester and mixtures thereof, and $AR_2$ is a residue from the condensation of a compound selected from the group consisting of naphthalene-2,6-dicarboxylic acid, a naphthalene-2,6-dicarboxylic acid ester, and mixtures thereof; and
    (2) from 0 to 200% by weight, based on the weight of the copolyamide, of additives or fillers.

2. A copolyamide composition according to claim 1, wherein R is an alkylene radical having between 4 and 12 carbon atoms.

3. A copolyamide composition according to claim 1, wherein R is an alkylene radical having between 4 and 9 carbon atoms.

4. A copolyamide composition according to claim 1, wherein R is an alkylene having 6 carbon atoms.

5. A copolyamide composition according to claim 1, wherein said copolyamide constitutes 50 to 90 mole % of the repeating units of (1)(a) and 50 to 10 mole % of the repeating units of (1)(b).

6. A copolyamide composition according to claim 1, wherein said polyamide constitutes 60 to 80 mole % of the repeating units of (1)(a) and 40 to 20 mole % of the repeating units of (1)(b).

7. A copolyamide composition according to claim 1, wherein $AR_1$ is terephthalic acid and $AR_2$ is the methyl diester of naphthalene-2,6-dicarboxylic acid.

8. A copolyamide composition according to claim 1, wherein said composition has a high crystallinity, a fusion enthalpy ΔH greater than 3.5 cal/g, and a melting point Tm higher than 270° C.

9. A copolyamide composition according to claim 1, wherein said copolyamide further consists essentially of from 0 to 15 mole % of repeating units selected from the group consisting of lactams having 6, 11 or 12 carbon atoms, amino acids, and mixtures thereof.

10. A copolyamide composition comprising:
    (1) a copolyamide comprising:
        (a) from 1 to 99 mole % repeating units of the formula —(NH—R—NHCO—$AR_1$—CO)—; and
        (b) from 99 to 1 mole % repeating units of the formula —(NH—R—NHCO—$AR_2$—CO)—; wherein R is alkylene having from 4 to 20 carbon atoms, $AR_1$ is a residue from the condensation of a compound selected from the group consisting of terephthalic acid, a terephthalic acid diester and mixtures thereof, and $AR_2$ is a residue from the condensation of a compound selected from the group consisting of naphthalene-2,6-dicarboxylic acid, a naphthalene-2,6-dicarboxylic acid ester and mixtures thereof; and
    (2) from 0 to 200% by weight, based on the weight of the copolyamide, of additives or fillers,
    wherein said copolyamide is free of repeating units containing isothalate groups.

11. A molded article comprising the copolyamide composition of claim 1.

12. A process for preparing the copolyamide of claim 1, comprising the steps of reacting terephthalic acid or diester thereof and naphthalene-2,6-dicarboxylic acid or diester thereof, with an alkylene diamine having from 4 to 20 carbon atoms, at a temperature between 280° and 350° C. for a period of between 20 minutes and 10 hours, forming thereby a copolyamide, and thereafter recovering said copolyamide.

13. A process for preparing the copolyamide of claim 1, comprising the steps of (a) reacting terephthalate acid or a diester thereof and naphthalene-2,6-dicarboxylic acid or a diester thereof with from 10 to 99 mole % of a stoichiometric amount of an alkylene diamine having from 4 to 20 carbon atoms, thereby forming a partial reaction product, and (b) further reacting the partial reaction product of step (a) with the remaining stoichiometric amount of said diamine;
    wherein the reaction temperature of steps (a) and (b) is between 240° and 350° C. and the total reaction time of steps (a) and (b) is between 1 and 10 hours.

14. A process for preparing the copolyamide as claimed in claim 1, comprising the steps of (a) reacting in a first polymerization step, terephthalic acid or a diester thereof and naphthalene-2,6-dicarboxylic acid or a diester thereof with an alkylene diamine having from 4 to 20 carbon atoms, said reaction being carried out at a reaction temperature of between 280° and 350° C. and for a period of from 20 minutes to 10 hours, said reaction thereby being between 40 and 99% completed, and (b) increasing the viscosity of the reaction product of step (a).

* * * * *